July 14, 1931.    T. A. MARTIN    1,814,049
AUTOMOBILE SERVICING DEVICE
Filed Feb. 16, 1927    2 Sheets-Sheet 1
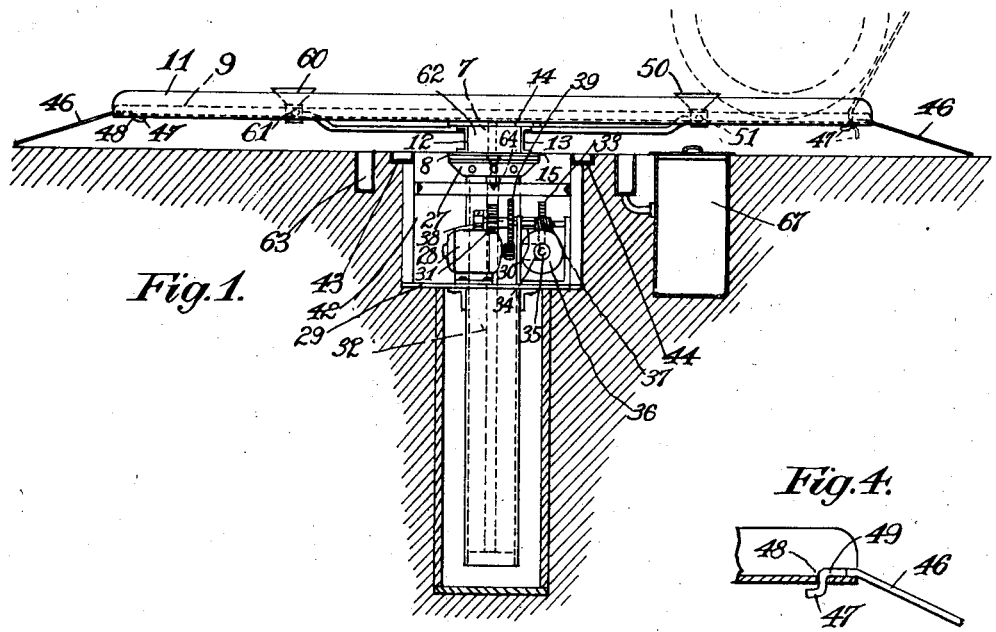
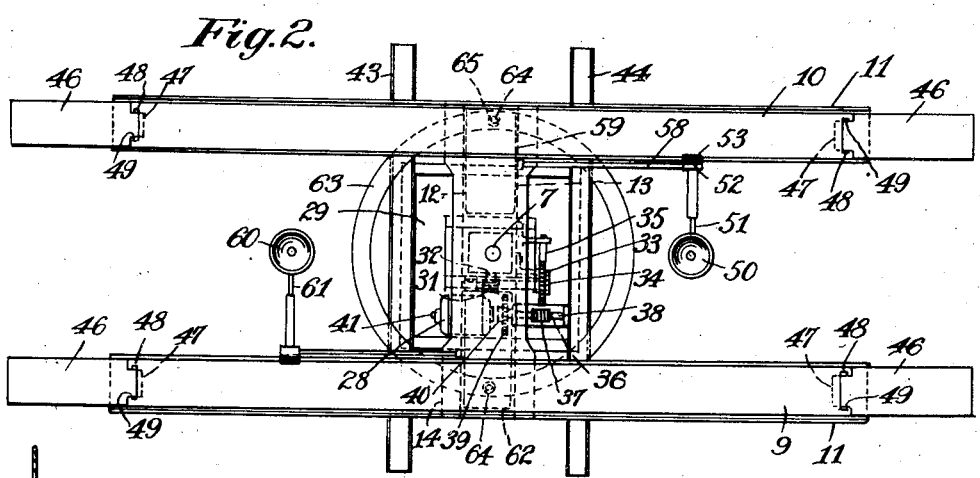
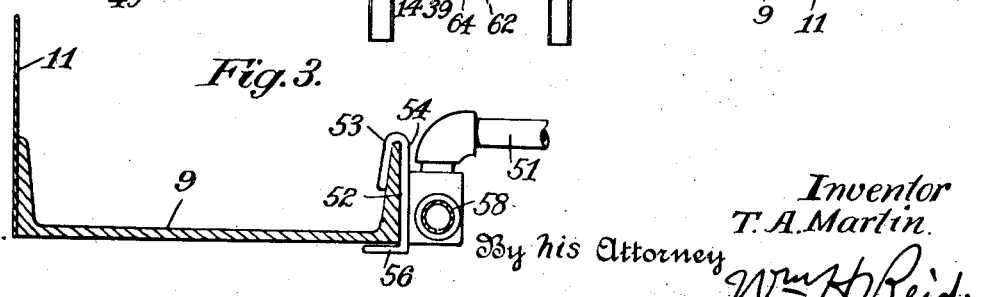

July 14, 1931.  T. A. MARTIN  1,814,049
AUTOMOBILE SERVICING DEVICE
Filed Feb. 16, 1927   2 Sheets-Sheet 2
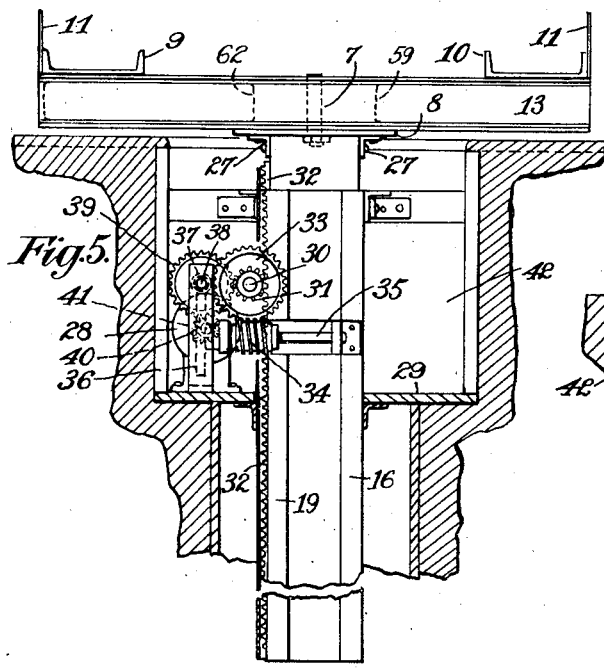
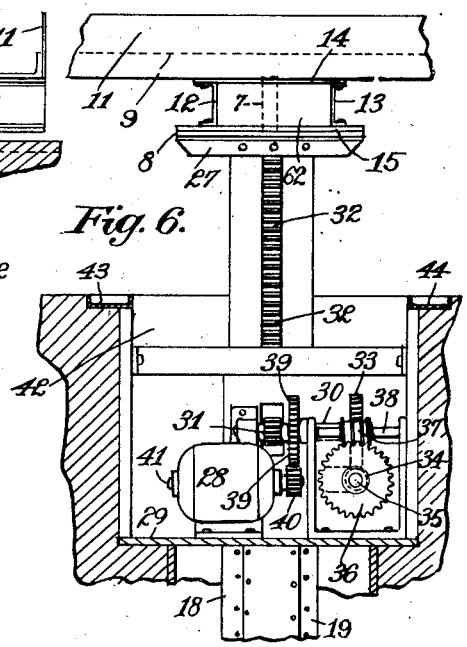
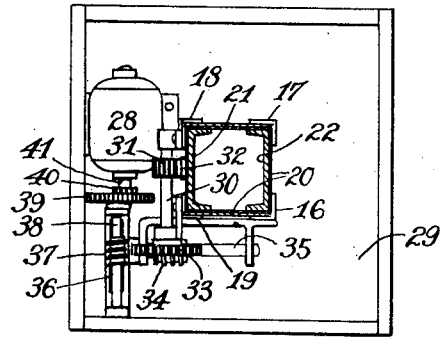
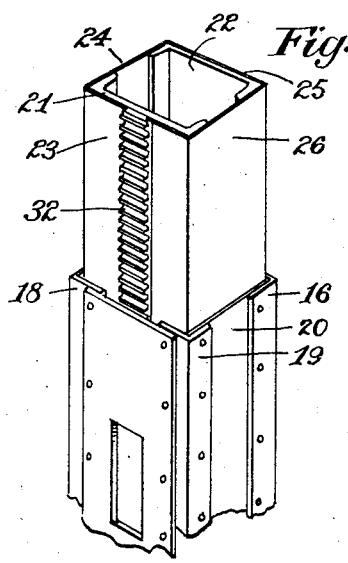
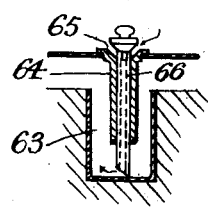
Inventor.
T. A. Martin
By his Attorney
Wm H Reid.

Patented July 14, 1931

1,814,049

UNITED STATES PATENT OFFICE

THOMAS A. MARTIN, OF BRIDGEPORT, CONNECTICUT

AUTOMOBILE SERVICING DEVICE

Application filed February 16, 1927. Serial No. 168,509.

The present invention relates to an improved automobile rack and crank case draining device, and more particularly to an auto lift having means for draining fluids from the car, such as crank case oil. The invention further relates to a rotary automobile rack having means associated therewith for receiving fluid in all rotary positions of the rack.

Other features of the invention will be apparent from the following description and claims, and by reference to the accompanying drawings.

The specific operating means for the automobile lift, and other details of construction thereof are set forth and claimed in my divisional application Serial No. 316,475, filed November 1, 1928.

In the accompanying drawings showing one embodiment of my invention,

Figure 1 is a side elevation partly in section in lowered position.

Fig. 2 is a plan view.

Fig. 3 is an enlarged section through one track member.

Fig. 4 shows a detail.

Fig. 5 shows a section at right angles to that of Fig. 1.

Fig. 6 is an elevation of the latter.

Figs. 7 and 8 show details of the column.

Fig. 9 shows the drain valve device.

The apparatus is shown as comprising a frame or track device mounted on a column, in two telescoping portions, and having a motor mounted on the column to raise the track member. As shown I provide a pair of track bars 9 and 10 preferably of channel form, that may have a guard plate 11 on one side. These bars are suitably supported and connected to extend parallel the proper distance apart to receive the four wheels of an auto. As shown I provide a cross member constructed of two upright channel bars 12 and 13 secured to top and bottom plates 14, 15. An upright column is provided that supports the cross member, and as shown this column is composed of four angle bars 16, 17, 18 and 19, spaced apart in the form of a square and connected by plates 20. Another column or post is provided that slides on this stationary column, preferably inside of the same, and as shown is composed of two channel bars, 21 and 22, connected by plates 23 and 24 at the ends, and which also have plates 25 and 26 to form additional support for the inner post, that is freely slidable in this main column. The latter is sunk in the ground or floor as indicated in Fig. 1. The inner column or post has a top plate 8, suitably secured as by angle brackets 27. The cross member bottom plate 15 rests on this plate 8 and a pivot bolt 7 passes through the two plates, so that the track member can turn around on the post.

Means are provided for raising this inner post, such as an electric motor, that is connected therewith by suitable reduction gearing including worm gearing to prevent backward motion of the post. As shown an electric motor 28 is mounted on a shelf 29 on the column. A cross shaft 30 carries a pinion 31 that meshes with a rack bar 32 fast to the side plate 26 of the inner post. This shaft 30 carries a worm wheel 33 that engages a worm 34 on a shaft 35; which shaft 35 carries a worm wheel 36, that engages a worm 37 on a shaft 38; and gear 39 on shaft 38 engages a gear 40 on motor shaft 41. The shelf 29 is part of a frame or housing 42 for the motor. The column or the motor frame may be supported on the ground or floor, but as shown a pair of bars 43 and 44 are secured to the upper part of the motor frame projecting some distance beyond the same to rest on the floor or ground and thus support the column and all parts connected thereto.

It will be understood that when the track frame is in the lowered position as shown in Fig. 1, the tracks will be near the ground or on the same level, and the wheels of the car are run onto the tracks. Then the motor is started and the inner post will be slowly raised to elevate the auto the desired height above the floor, to give unrestricted access beneath all parts of the auto. At any elevation of the auto the track member can be turned to any position to give better access. To assist in running the wheels onto the track bars a plate 46 is attached to the ends of the track at one or both ends. This plate is shown as hooked onto the end of the track bar and extends down at an incline to the floor. It may have a hook end 47 that projects down through a hole 48 in the track bar, and is so bent that it can be swung up until the straight part 49 of the hook is upright in the hole, that will support the plate in an upwardly inclined position extending outwardly to prevent the wheel passing off the end of the track; see Fig. 1.

When a device of this character holds the car in a raised position, it is frequently desirable to withdraw fluids from parts of the car, such as oil from the crank case. The latter is usually at a certain part of the car, and I provide an arrangement that will be carried by the track member to be located beneath the crank case so that it is only necessary to open the outlet and the oil can drain by gravity to a suitable receptacle. As shown I arrange a funnel 50 carried by a pipe 51 on a bracket 52, in the form of a bent plate that has a hook portion 53 bent over from its upright part 54 and which is secured to the pipe 51; and a bend 56 is made in the bottom of this hook to engage the flange 57 of the track bar. It will be seen from Fig. 2 that the funnel 50 extends out to the middle of the track member between the center and end, where the crank case outlet is usually located. A pipe 58 connects with the pipe 51 along the track and leads to a tank 59 located inside of the cross bar 12—13. It will be understood that the oil can thus be drained from the crank case into this tank in any position of the track frame. A duplicate of this funnel arrangement is shown at 60 in the other side of the cross bar, that connects by pipe 61 with a tank 62 in the cross bar that will operate in the same manner, should the car be in reversed position on the track.

I further provide means to cause the oil to be drained out of these tanks upon the track member being lowered, and which will operate in any rotary position of the track member. As shown I arrange an annular tank 63 on the motor frame, and each tank 59 and 62 has an outlet valve 64 on a valve seat 65 with a stem 66. The valve is normally seated, but when the track member is lowered the valve stem will strike the annular tank 63 and be raised causing the tank 60 to drain in to tank 63. When raised the valve will again close. A tank 67 will drain the tank 63.

What I claim is:—

1. In an auto lift, a track member comprising a pair of parallel track bars connected by a cross member and spaced apart to receive the wheels of an auto, means to elevate and depress the track member, a tank carried by the track member, a funnel carried by the track member arranged to receive fluid from the auto, a pipe from the funnel to the tank, and means to automatically drain the tank when the track member is lowered from the elevated position.

2. In an auto lift, a track member comprising a pair of parallel track bars connected by a cross member and spaced apart to receive the wheels of an auto, means to elevate and depress the track member, a funnel carried by the track member arranged to receive fluid from the auto, a tank carried by the track member connected with the funnel to drain its fluid, a valve on the tank normally closed, and means to open the valve when the track member is lowered from raised position, and which valve will close when the tank is again raised.

3. In an auto lift, a track member comprising a pair of parallel track bars connected by a cross bar and spaced to receive the wheels of an auto, a single column having a slide post thereon that supports the track member rotatable thereon, means to actuate the slide post to elevate and depress the track member, a tank carried by the track member, a funnel carried by the track member arranged to drain into the tank, and means to automatically drain the tank when the track member is lowered from a raised position in all rotary positions of the track member.

4. In an auto lift, a track member, means to elevate and depress the track member, means carried by said track member arranged to receive fluid from the auto, and means for automatically draining fluid from the fluid receiving means carried by said track member as said member is lowered from the elevated position.

5. In an auto lift, a track member, means to vertically reciprocate the track member, means carried by said track member and arranged to receive fluid from the auto, and means operated by the reciprocation of said track member for automatically draining the fluid from the fluid receiving means carried by the track member.

6. In an auto lift, a track member, means for rotatably supporting said track member, means for elevating and depressing said supporting means, means carried by said track member for receiving fluid from said auto, and means for automatically draining the fluid from said fluid receiving means in all rotary positions of the track member on lowering said track member from a raised position.

7. In combination with a rotatable automobile service rack, a drain funnel carried by said rack in position to receive fluid from an automobile being serviced, a drain tank also carried by the rack for receiving fluid from the funnel, and a circular pit beneath the rack for receiving fluid from said tank in all rotary positions of the rack.

8. In combination with a movable automobile rack comprising a pair of flanged track members spaced apart to receive the wheels of an automobile, a drain system carried by the rack, and a fixed receiving system beneath the rack for receiving fluid from the rack-carried drain system, the said rack-carried drain system including a funnel movable to a position beneath the crank case of an automobile being serviced, a drain pipe leading from the funnel, a tank for collecting oil from the drain pipe, and a hook fitting over one of said track members for supporting said drain pipe, said hook having a bent-over portion to engage the inner face of the track flange, an upright portion engaging the outside of the track flange, and a horizontal portion engaging beneath the bottom of the track.

Signed this 7 day of February, 1927.

THOMAS A. MARTIN.